US012592747B2

(12) United States Patent
Viering et al.

(10) Patent No.: US 12,592,747 B2
(45) Date of Patent: Mar. 31, 2026

(54) METHOD AND APPARATUS FOR DETERMINING INFORMATION CHARACTERIZING SPATIAL SEPARATION BETWEEN RADIO CELLS

(71) Applicant: Nokia Technologies Oy, Espoo (FI)

(72) Inventors: Ingo Viering, Munich (DE);
Irina-Mihaela Balan, Munich (DE);
Ahmad Awada, Munich (DE);
Guillaume Decarreau, Munich (DE)

(73) Assignee: Nokia Technologies Oy, Espoo (FI)

( * ) Notice: Subject to any disclaimer, the term of this patent is extended or adjusted under 35 U.S.C. 154(b) by 378 days.

(21) Appl. No.: 18/248,521

(22) PCT Filed: Oct. 11, 2021

(86) PCT No.: PCT/EP2021/078049
§ 371 (c)(1),
(2) Date: Apr. 10, 2023

(87) PCT Pub. No.: WO2022/084085
PCT Pub. Date: Apr. 28, 2022

(65) Prior Publication Data
US 2023/0379733 A1 Nov. 23, 2023

(30) Foreign Application Priority Data
Oct. 22, 2020 (EP) .................................... 20203213

(51) Int. Cl.
*H04B 7/04* (2017.01)
*H04W 24/08* (2009.01)

(52) U.S. Cl.
CPC .............. *H04B 7/04* (2013.01); *H04W 24/08* (2013.01)

(58) Field of Classification Search
CPC .......... H04B 7/04; H04B 7/06; H04B 7/0417; H04B 7/0617; H04W 24/08
See application file for complete search history.

(56) References Cited

U.S. PATENT DOCUMENTS 9,860,808 B2      1/2018  Xiao et al.
2011/0243040 A1*  10/2011  Khan ................... H01Q 21/061
                                                      370/280
(Continued)

FOREIGN PATENT DOCUMENTS

CN        110537334 A      12/2019
CN        111149388 A       5/2020
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.
(Continued)

*Primary Examiner* — Asad M Nawaz
*Assistant Examiner* — Michael Wayne Maddox
(74) *Attorney, Agent, or Firm* — Lippes Mathais LLP

(57) ABSTRACT

An apparatus, comprising at least one processor, and at least one memory storing instructions, the at least one memory and the instructions configured to, with the at least one processor, cause a user equipment to determine a first
(Continued)

information characterizing a spatial separation of a radio cell associated with the user equipment with respect to at least two antenna panels of the user equipment.

18 Claims, 5 Drawing Sheets

(56) References Cited

U.S. PATENT DOCUMENTS

| | | | |
|---|---|---|---|
| 2015/0372797 A1 | 12/2015 | Fuijio et al. | |
| 2017/0111096 A1* | 4/2017 | Nabetani | H04B 7/0617 |
| 2017/0214446 A1* | 7/2017 | Rappaport | H04B 7/0617 |
| 2018/0316407 A1* | 11/2018 | Rahman | H04B 7/0621 |
| 2020/0186263 A1 | 6/2020 | Zhang et al. | |
| 2021/0136566 A1* | 5/2021 | Manolakos | H04W 8/24 |
| 2021/0194551 A1* | 6/2021 | Raghavan | H04B 7/0617 |
| 2022/0272573 A1* | 8/2022 | Liu | H04L 45/124 |

FOREIGN PATENT DOCUMENTS

| | | | |
|---|---|---|---|
| WO | 2017/080132 A1 | 5/2017 | |
| WO | 2019/049110 A1 | 3/2019 | |
| WO | 2019/096843 A1 | 5/2019 | |
| WO | 2020/176895 A1 | 9/2020 | |
| WO | 2020/215335 A1 | 10/2020 | |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.2.0, Jul. 2020, pp. 1-148.

Partial European Search Report received for corresponding European Patent Application No. 20203213.2, dated Apr. 1, 2021, 17 pages.

Extended European Search Report received for corresponding European Patent Application No. 20203213.2, dated Jul. 5, 2021, 21 pages.

Invitation to Pay Additional Fees received for corresponding Patent Cooperation Treaty Application No. PCT/EP2021/078049, dated Feb. 2, 2022, 14 pages.

International Search Report and Written Opinion received for corresponding Patent Cooperation Treaty Application No. PCT/EP2021/078049, dated Apr. 25, 2022, 27 pages.

Office Action received for corresponding Indian Patent Application No. 202347034493, dated Aug. 30, 2024, 8 pages.

Office Action received for corresponding European Patent Application No. 20203213.2, dated Apr. 12, 2024, 20 pages.

Office action received for corresponding Chinese Patent Application No. 202180072451.4, dated Jan. 9, 2026, 7 pages of office action and no page of translation available.

* cited by examiner

300 — DETERMINE FIRST INFORMATION CHARACTERIZING SPATIAL SEPARATION BETWEEN RADIO CELLS

I-1

302 — USE FIRST INFORMATION

302a — CONTROL OPERATION OF USER EQUIPMENT BASED ON FIRST INFORMATION

302b — TRANSMIT FIRST INFORMATION AND/OR SECOND INFORMATION TO NETWORK DEVICE

I-1, I-2

I-1

P-1     P-2

310 — DETERMINE SCALING FACTOR(S) FOR MODIFYING AT LEAST ONE OF FIRST AND SECOND PARAMETER

SF-1, SF-2

312 — MODIFY AT LEAST ONE OF FIRST AND SECOND PARAMETER BASED ON SCALING FACTOR(S)

320 — DETERMINE REPORTING EVENT BASED ON FIRST INFORMATION

322 — TRANSMIT FIRST INFORMATION AND/OR SECOND INFORMATION TO NETWORK DEVICE

I-1, I-2

300a — DETERMINE FIRST PARAMETER

P-1

300b — DETERMINE SECOND PARAMETER

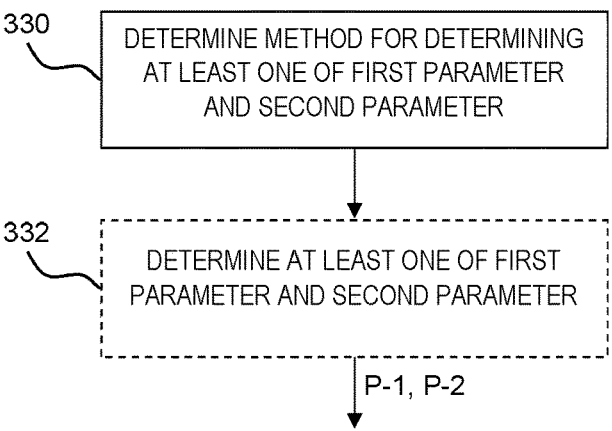

330 — DETERMINE METHOD FOR DETERMINING AT LEAST ONE OF FIRST PARAMETER AND SECOND PARAMETER

332 — DETERMINE AT LEAST ONE OF FIRST PARAMETER AND SECOND PARAMETER

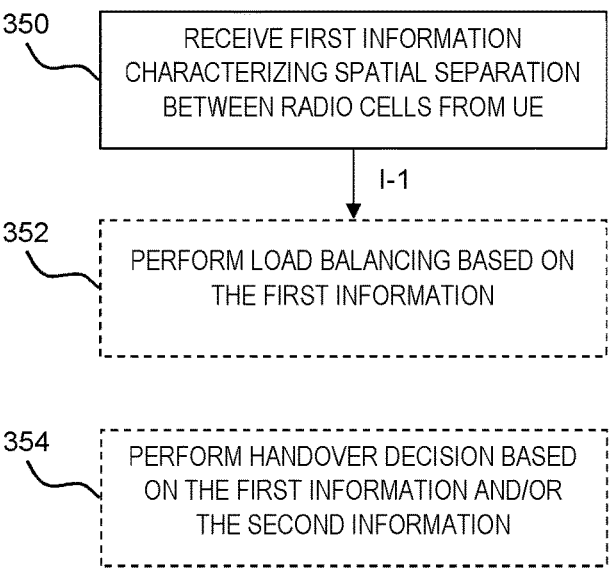

350 — RECEIVE FIRST INFORMATION CHARACTERIZING SPATIAL SEPARATION BETWEEN RADIO CELLS FROM UE

I-1

352 — PERFORM LOAD BALANCING BASED ON THE FIRST INFORMATION

354 — PERFORM HANDOVER DECISION BASED ON THE FIRST INFORMATION AND/OR THE SECOND INFORMATION

Fig. 13

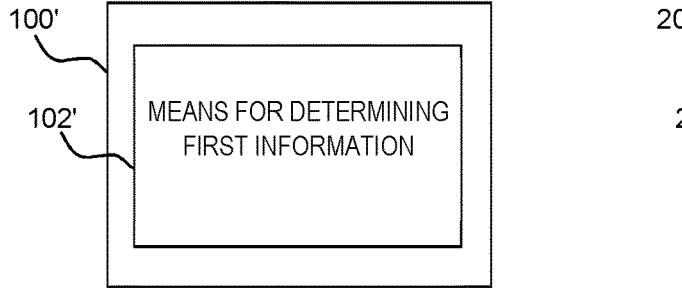

100'
102' — MEANS FOR DETERMINING FIRST INFORMATION

Fig. 14

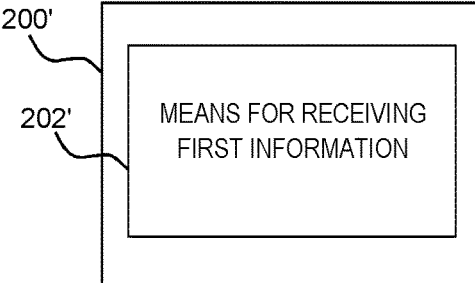

200'
202' — MEANS FOR RECEIVING FIRST INFORMATION

360 — TRANSMIT SCALING FACTOR(S) TO USER EQUIPMENT

↓ SF-1, SF-2

362 — INSTRUCT UE TO CHOOSE METHOD FOR DETERMINING AT LEAST ONE OF FIRST PARAMETER AND SECOND PARAMETER

↓

364 — RECEIVE INDICATION WHICH SCALING FACTOR(S) HAVE BEEN APPLIED BY USER EQUIPMENT

↓ IND

SC-1

SC-2

SC-3

SRC          UE'          TGT

METHOD AND APPARATUS FOR DETERMINING INFORMATION CHARACTERIZING SPATIAL SEPARATION BETWEEN RADIO CELLS

RELATED APPLICATION

This application claims priority to PCT Application No. PCT/EP2021/078049, filed on Oct. 11, 2021, which claims priority to EP Application Serial No. 20203213.2, filed on Oct. 22, 2020, each of which is incorporated herein by reference in its entirety

FIELD OF THE INVENTION

Various example embodiments relate to an apparatus comprising at least one processor.

Further embodiments relate to a method of operating related to such apparatus.

BACKGROUND

Wireless communications systems may e.g. be used for wireless exchange of information between two or more entities, e.g. comprising one or more terminal devices, e.g. user equipment, and one or more network devices such as e.g. base stations.

Some terminal devices may comprise more than one antenna panel for wireless information exchange, e.g. with network devices. User equipment with multiple antenna panels may e.g. be denoted as multi-panel UE (MPUE).

SUMMARY

Various embodiments of the disclosure are set out by the independent claims. The exemplary embodiments and features, if any, described in this specification, that do not fall under the scope of the independent claims, are to be interpreted as examples useful for understanding various exemplary embodiments of the disclosure.

Some embodiments relate to an apparatus comprising at least one processor, and at least one memory storing instructions, the at least one memory and the instructions configured to, with the at least one processor, cause a user equipment to determine a first information characterizing a spatial separation of a radio cell associated with the user equipment with respect to at least two antenna panels of the user equipment.

In some embodiments, the apparatus may be an apparatus for a wireless communications system.

In some embodiments, the apparatus or its functionality, respectively, may be provided in a terminal device of the communications system, for example in a user equipment (UE) or in a data modem or the like.

In some embodiments, the apparatus according to the embodiments or its functionality, respectively, may be used for or within wireless communications systems, e.g. networks, based on or at least partially adhering to third generation partnership project, 3GPP, radio standards such as 4G E-UTRAN or 5G NR (fifth generation new radio) or other radio access technology.

In some embodiments, the instructions, when executed by the at least one processor, cause the user equipment to at least temporarily use the first information for at least one of: a) controlling an operation of the user equipment, b) transmitting at least one of b1) the first information and b2) a second information, which can be derived based at least on the first information, to a network device.

In some embodiments, controlling an operation of the user equipment may e.g. comprise determining whether and/or when to transmit the first information or e.g. a measurement report based on the first information, e.g. to a network device, e.g. a serving base station.

In some embodiments, transmitting the first information and/or the second information to the network device may e.g. enable or at least aid the network device to perform load balancing, e.g. onloading or offloading terminal devices, e.g. based on the spatial separation characterized by the first information.

In some embodiments, the second information may e.g. comprise a measurement report or a part of a measurement report, e.g. comprising the first information.

In some embodiments, the first information comprises at least one of: a) a first parameter characterizing a spatial separation of a neighbor cell, e.g. as measured by the user equipment, b) a second parameter characterizing a spatial separation of a serving cell, e.g. as measured by the user equipment.

In some embodiments, the first parameter may be denoted as "Dn", whereas e.g. the second parameter may be denoted as "DP".

In some embodiments, the instructions, when executed by the at least one processor, cause the user equipment to modify, e.g. change, at least one of the first parameter and the second parameter based on at least one scaling factor. This enables further degrees of freedom, e.g. when using the first parameter and the second parameter to control an operation of the user equipment.

In some embodiments, the user equipment may determine the at least one scaling factor, e.g. by evaluating a configuration, e.g. a predetermined configuration. In some embodiments, the configuration may also be determined by standardization.

In some embodiments, determining the at least one scaling factor may comprise receiving, by the user equipment, configuration information characterizing the at least one scaling factor.

In some embodiments, a serving cell or the network device associated with the serving cell, e.g. a serving base station, may provide the at least one scaling factor, e.g. as a part of a measurement configuration provided to the user equipment, e.g. using an RRC (Radio Resource Control) Reconfiguration message, e.g. according to some accepted specification.

In some embodiments, at least one of the scaling factors may e.g. be denoted as "scalen_onload", whereas a further one of the scaling factors may e.g. be denoted as "scalep_offload".

In some embodiments, the instructions, when executed by the at least one processor, cause the user equipment to determine a reporting event, e.g. measurement reporting event, based on the first information, and to transmit at least one of the first information and a second information, which can be derived based at least on the first information, to a network device.

In some embodiments, the measurement reporting event may be used to signal to a network device, e.g. a serving base station, that a handover from the serving base station to a neighbor base station, e.g. target base station for the handover process, should be performed.

In some embodiments, the measurement reporting event may be an A3 event according to some accepted specifications. In other words, in some embodiments, the A3 event of some accepted specifications may be enhanced, e.g. by providing the first information and/or second information in the A3 measurement report.

In some embodiments, the measurement reporting event may be characterized based on the following relation:

$$Mn-Dn+Ofn+Ocn-Hys>Mp-Dp+Ofp+Ocp+Off+Hys \quad \text{(relation 1)},$$

wherein Mn characterizes a measurement result, e.g. cell quality, of a neighbor cell, wherein wherein Mp characterizes a measurement result, e.g. cell quality, of a serving cell, wherein Dn is the first parameter of the first information, wherein Dp is the second parameter of the first information, wherein Ofn is a measurement object specific offset of a reference signal of the neighbor cell, wherein Ofp is a measurement object specific offset of a reference signal of the serving cell, e.g. offsetMO as defined within a measObjectNR corresponding to the neighbur cell according to some accepted specification.

In some embodiments, in relation 1, Ocn characterizes a cell-specific offset of the neighbor cell, and Ocp characterizes a cell-specific offset of the serving cell, e.g. cellIndividualOffset as defined within measObjectNR according to some accepted specification, corresponding to a frequency of the neighbor cell, and set to zero if not configured for the neighbor cell.

In some embodiments, in relation 1, Hys is a hysteresis parameter for the measurement reporting event, e.g. a hysteresis as defined within reportConfigNR according to some accepted specification.

In some embodiments, in relation 1, Off is an offset parameter for the measurement reporting event, e.g. an A3-Offset as e.g. defined within reportConfigNR according to some accepted specification.

In some embodiments, the measurement reporting event may be characterized based on the following relation:

$$Mn-\text{scalen}_{onload}\cdot Dn+Ofn+Ocn-Hys>Mp-$$
$$\text{scalep}_{offload}\cdot DP+Ofp+Ocp+Off+Hys \quad \text{(relation 2)},$$

wherein $\text{scalen}_{onload}$ characterizes the first scaling factor, and wherein $\text{scalen}_{onload}$ characterizes the second scaling factor.

In some embodiments, the first scaling factor "scalen_onload" may be configured by the network, and may e.g. control an onloading (e.g. per neighbor n) associated with a radio cell. In some embodiments, the first scaling factor may comprise a value between 0 and 1, wherein a value of 0 deactivates onloading, and wherein a value of 1 enables to exploits spatial separation information according to some embodiments.

As an example, assuming a 20 dB backward attenuation of a neighbor, e.g. target, cell on a serving antenna panel ("panel 1"), in some embodiments, this means that the user equipment may stay up to 20 dB "longer" in the serving cell ("onloading"), and this may e.g. be achieved by scaling down the neighbor measurement Mn by up to 20 dB for onloading. In some embodiments, the network can decide via the first scaling factor "scalen_onload" (e.g., via choosing a specific value for the first scaling factor), whether and how aggressively to do the onloading. In some embodiments, the first scaling factor may e.g. be used by empty cells (or by cells with comparatively low load), which are willing to accommodate load from neighbor cells.

In some embodiments, a serving antenna panel is defined as the antenna panel that receives the serving cell or beam, respectively, with the highest quality.

In some embodiments, the second scaling factor "scalep_offload" may be configured by the network, and may e.g. be used to control an offloading associated with a radio cell.

In some embodiments, the second scaling factor may comprise a value between 0 and 1, wherein a value of 0 deactivates offloading, and wherein a value of 1 (fully) enables offloading, e.g. to exploit spatial separation information according to some embodiments. As an example, in some embodiments, one may scale down a SpCell (Special Cell) measurement by up to 20 dB and send early reports (offloading), e.g. if spatial separation allows.

In some embodiments, the second scaling factor scalep_offload (and the second parameter Dp) may e.g. be used by crowded cells which are willing to offload load towards empty (or less loaded) neighbor cells.

In some embodiments, the instructions, when executed by the at least one processor, cause the user equipment to determine the first parameter, e.g. Dn, based on a difference between a measurement result of the neighbor cell and at least one of: a) a measurement result associated with the neighbor cell performed on one of the at least two antenna panels serving the serving cell, b) an average value of the measurement results associated with the neighbor cell and all of the at least two antenna panels, c) an average value of the measurement results associated with the neighbor cell and all of the at least two antenna panels different from a serving panel for the neighbor cell, and d) the maximum measurement result of the at least two antenna panels except the serving panel for the neighbor cell.

In some embodiments, the instructions, when executed by the at least one processor, cause the user equipment to determine the second parameter, e.g. Dp, based on a difference between a measurement result of the serving cell and at least one of: a) a measurement result associated with the serving cell and one of the at least two antenna panels that would be used for serving the neighbor cell, b) an average value of the measurement results associated with the serving cell and all of the at least two antenna panels, c) an average value of the measurement results associated with the serving cell and all of the at least two antenna panels different from a serving panel for the serving cell, and d) the maximum measurement result of the at least two antenna panels except the one of the at least two antenna panels serving the serving cell.

In the following, the variants a), b), c), d) of determining the first parameter (Dn) and of determining the second parameter (Dp) according to some embodiments can be further detailed, see for example the following four options according to further embodiments:

In some embodiments, "M_x_y" is assumed to be the measurement of "cell x" on "antenna panel y", and px is the antenna panel used to serve cell x, i.e. pp is the serving panel used to serve the serving cell p. In some embodiments, "Mx" is defined as the best measurement among all M_x_y.

In some embodiments, the following exemplary options ("Option 1" to "Option 4") are usable, e.g. for determining the first parameter Dn and/or the second parameter Dp, e.g. as a difference between the measurement Mx and:

Option 1: measurement on a specific antenna panel, for example:

Dn=Mn−M_n_pp, i.e., the target cell measurement n on the serving panel pp. M_n_pp can e.g. be computed by taking an average of N' many strongest beams of a target cell n on a serving panel pp above a threshold T'.

Dp=Mp−M_p_pn, i.e. the SpCell measurement on the panel pn that would be used for serving target cell n. M_p_pn can be computed by taking average of N" strongest beams of serving cell p on serving panel pn of target cell n above threshold T'.

Option 2: average of all panels (mean_y [M_x_y])

Dn=Mn−mean_y [M_n_y], where "mean_y [M_n_y]" denotes the average of M_n_y overall antenna panels.

Dp=Mp−mean_y [M_p_y] where "mean_y [M_p_y]" denotes the average of M_p_p overall panels.

Option3: average of all "other" panels (mean_y [M_x_{y< >px}])

Dn=Mn−mean_y [M_n_{y< >pn}] where "mean_y [M_n_{y< >pn}]]" denotes the average of M_n_y taken from the panels that are different from serving panel pn of target cell n.

Dp=Mp−mean_y [M_p_{y< >pp}] where "mean_y [M_p_{y< >pp}]" denotes the average of M_p_y taken from the panels that are different from pp of serving cell p.

Option4: the maximum of the other panels (max_y [M_x_{y< >px}])

Dn=Mn−max_y [M_n_{y< >pn}] where max_y [M_n_{y< >pn}] denotes the maximum M_n_y taken from the panels that are different from serving panel pn of target cell n.

Dp=Mp−max_y [M_p_{y< >pp}] where max_y [M_p_{y< >pp}] denotes the maximum M_n_y taken from the panels that are different from serving panel pn of target cell n.

Note that in some embodiments, in case of a user equipment having two antenna panels, options 3 and 4 are equivalent.

In some embodiments, the user equipment may e.g. apply another, e.g. manufacturer specific, method for characterizing the spatial separations e.g. using the first parameter and the second parameter, and/or for representing the first information.

As an example, in some embodiments, the first information may be based on, e.g. analog, RF measurements, e.g. instead of digital measurements as exemplarily mentioned above with respect to the options 1 to 4. In some embodiments, this may simplify complexity for/of the user equipment, in particular if the user equipment is e.g. restricted to receive/measure on a single antenna panel at a time.

In some embodiments, if available, the user equipment may also use direction information of the involved cells, e.g. serving cell and/or neighbor cells (potential handover target cells). In some embodiments, the direction information may e.g. be based on an angle of arrival of respective signals associated with the respective cells. In some embodiments, the first information may be derived from a beam pattern, e.g. beam characteristic, of the antenna panel.

In some embodiments, the instructions, when executed by the at least one processor, cause the user equipment to determine a method for determining at least one of the first parameter and the second parameter based on at least one of: a) configuration, b) an indication from a network device.

In other words, in some embodiments, the user equipment may determine the first and/or second parameter, e.g. following one of the options 1 to 4 exemplarily mentioned above, 1) as specified in a specification or configuration, or 2) as indicated by the network device, e.g. serving cell, e.g. using a (e.g., dedicated) signalling (for example RRC Reconfiguration according to some accepted specification).

In some embodiments, e.g. in the latter case, the serving cell may use two bits to indicate which definition or option of the first parameter and/or the second parameter the user equipment shall apply.

Further embodiments relate to an apparatus, comprising at least one processor, and at least one memory storing instructions, the at least one memory and the instructions configured to, with the at least one processor, cause a network device to receive first information from a user equipment, e.g. a user equipment according to the embodiments, the first information characterizing a spatial separation of a radio cell associated with the user equipment with respect to at least two antenna panels of the user equipment. In some embodiments, the network device may e.g. be a base state, e.g. a gNodeB (gNB).

In some embodiments, the instructions, when executed by the at least one processor, cause the network device to perform load balancing based on the first information. In some embodiments, the load balancing may e.g. comprise onloading and/or offloading user equipment to/from at least one radio cell provided by the network device.

In some embodiments, the instructions, when executed by the at least one processor, cause the network device to perform at least one of: a) transmitting at least one scaling factor to the user equipment for modifying at least one of a first parameter and a second parameter of the first information based on the at least one scaling factor, wherein the first parameter characterizes a spatial separation of a neighbor cell, and wherein the second parameter characterizes a spatial separation of a serving cell, b) instructing the user equipment which method of a plurality of methods to choose for determining at least one of the first parameter and a second parameter, c) receiving an indication characterizing which scaling factor a user equipment has applied to its measurements associated with at least one cell.

In some embodiments, the receiving of the indication characterizing which scaling factor a user equipment has applied to its measurements associated with at least one cell may e.g. be performed by a target gNB for a handover process.

In some embodiments, the instructions, when executed by the at least one processor, cause the network device to perform a handover decision based on at least one of: a) the first information, b) the second information (e.g., measurement report).

Further embodiments relate to a method comprising: determining, by a user equipment, a first information characterizing a spatial separation of a radio cell associated with the user equipment with respect to at least two antenna panels of the user equipment.

Further embodiments relate to a method comprising: receiving, by a network device, first information from a user equipment, the first information characterizing a spatial separation of a radio cell associated with the user equipment with respect to at least two antenna panels of the user equipment.

Further embodiments relate to an apparatus comprising means for determining a first information characterizing a spatial separation of a radio cell associated with a user equipment with respect to at least two antenna panels of the user equipment. In some embodiments, the means for determining the first information may e.g. comprise at least one processor, and at least one memory storing instructions, the at least one memory and the instructions configured to, with the at least one processor, perform said steps.

Further embodiments relate to an apparatus comprising means for receiving first information from a user equipment, the first information characterizing a spatial separation of a radio cell associated with the user equipment with respect to at least two antenna panels of the user equipment. In some embodiments, the means for receiving the first information from a user equipment may e.g. comprise at least one processor, and at least one memory storing instructions, the at least one memory and the instructions configured to, with the at least one processor, perform said steps.

Further embodiments relate to a wireless communications system comprising at least one user equipment according to the embodiments.

Further embodiments relate to a wireless communications system comprising at least one network device according to the embodiments.

DESCRIPTION OF SOME EXEMPLARY EMBODIMENTS

Figure 1:
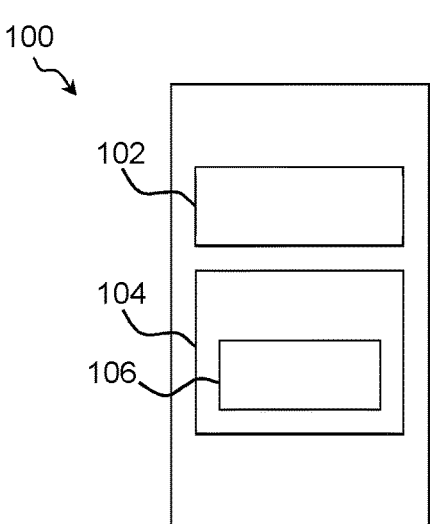
FIG. 1 schematically depicts a simplified block diagram of an apparatus according to some embodiments, FIG. 2 schematically depicts a simplified block diagram of an apparatus according to some embodiments, FIG. 3 schematically depicts a simplified block diagram according to some embodiments, FIG. 4 schematically depicts a simplified flow chart according to some embodiments, FIG. 5 schematically depicts a simplified flow chart according to some embodiments, FIG. 6 schematically depicts a simplified block diagram according to some embodiments, FIG. 7 schematically depicts a simplified flow chart according to some embodiments, FIG. 8 schematically depicts a simplified flow chart according to some embodiments, FIG. 9 schematically depicts a simplified flow chart according to some embodiments, FIG. 10 schematically depicts a simplified flow chart according to some embodiments, FIG. 11 schematically depicts a simplified flow chart according to some embodiments, FIG. 12 schematically depicts a simplified flow chart according to some embodiments, FIG. 13 schematically depicts a simplified block diagram according to some embodiments, FIG. 14 schematically depicts a simplified block diagram according to some embodiments, and FIG. 15 schematically depicts a simplified block diagram according to some embodiments.
Figure 4:
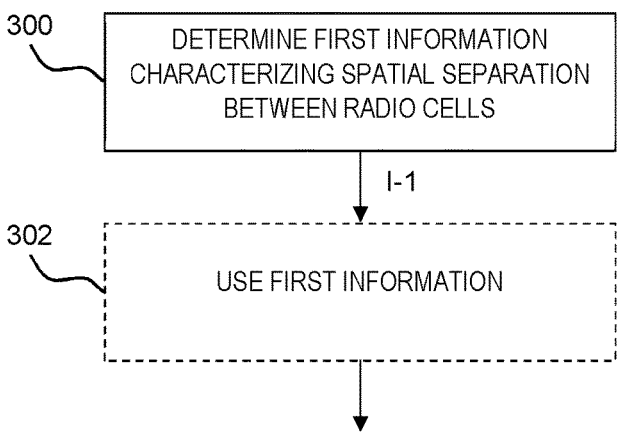

Some embodiments relate to an apparatus, e.g. for a terminal device, e.g. user equipment, of a wireless communications system. FIG. 1 schematically depicts a simplified block diagram of the apparatus 100 according to some embodiments, and FIG. 4 schematically depicts a simplified flow chart of a method of operating the apparatus 100 according to some embodiments.

The apparatus 100 (FIG. 1) comprises at least one processor 102, and at least one memory 104 storing instructions 106, the at least one memory 104 and the instructions 106 configured to, with the at least one processor 102, cause a user equipment 10 (FIG. 3) to determine 300 (FIG. 4) a first information I-1 characterizing a spatial separation of a radio cell C-1, C-2 (FIG. 3) associated with the user equipment 10 with respect to at least two antenna panels 11, 12 of the user equipment 10.

Figure 3:
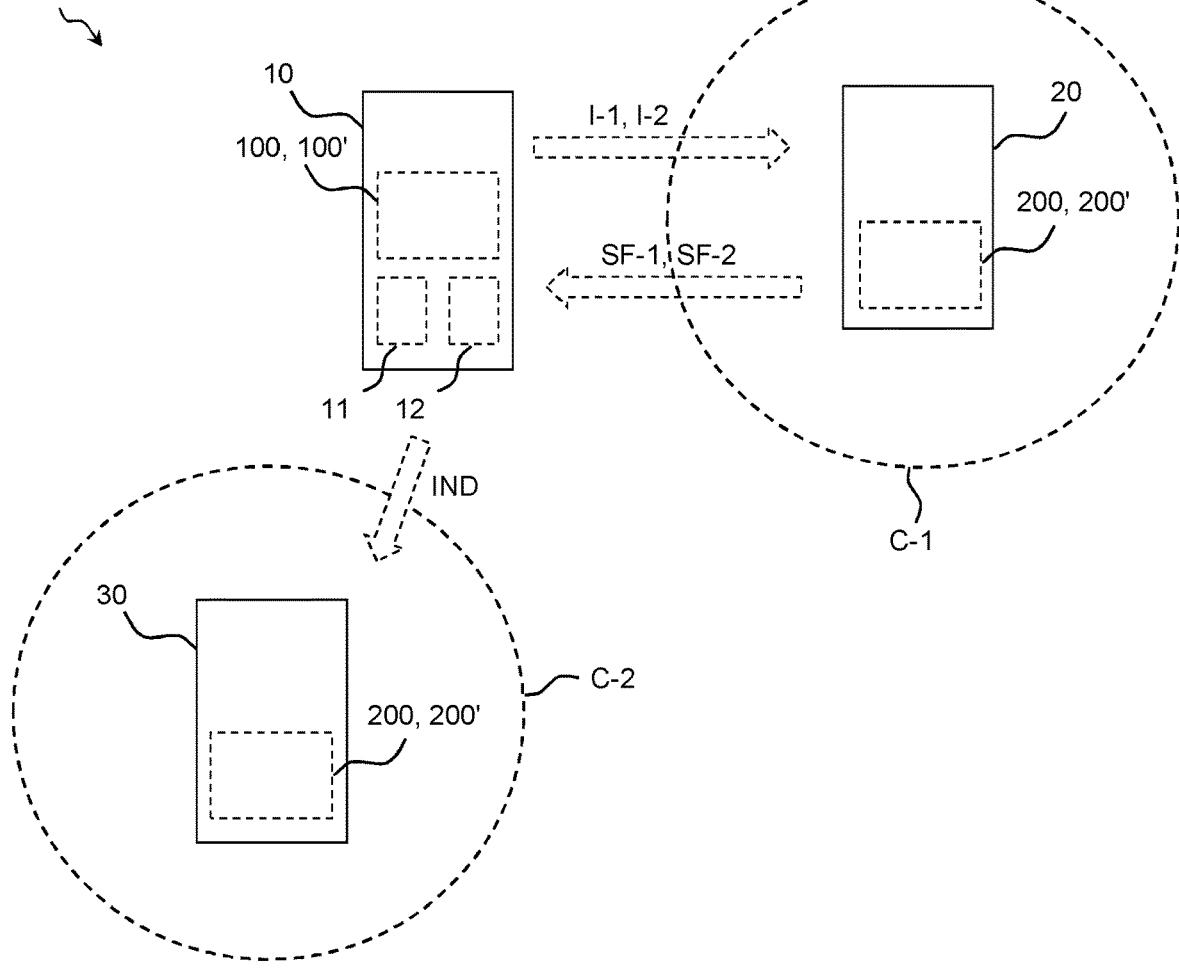

In some embodiments, the apparatus 100 may be an apparatus for a wireless communications system 1, see for example FIG. 3.

In some embodiments, the apparatus 100 or its functionality, respectively, may be provided in a terminal device 10 of the communications system 1, for example in a user equipment (UE) 10 or in a data modem (not shown) or the like.

In some embodiments, the apparatus 100 according to the embodiments or its functionality, respectively, may be used for or within wireless communications systems 1, e.g. networks, based on or at least partially adhering to third generation partnership project, 3GPP, radio standards such as 4G E-UTRAN or 5G NR (fifth generation new radio) or other radio access technology.

In some embodiments, a first radio cell C-1 may be a source cell of a (future) handover process, and a second radio cell C-2, e.g. neighbor cell, may be a potential target cell for the handover. The source cell C-1 is provided by a currently serving network device 20, e.g. gNB 20, and the target cell C-2 is provided by a neighbor gNB 30.

Figure 5:
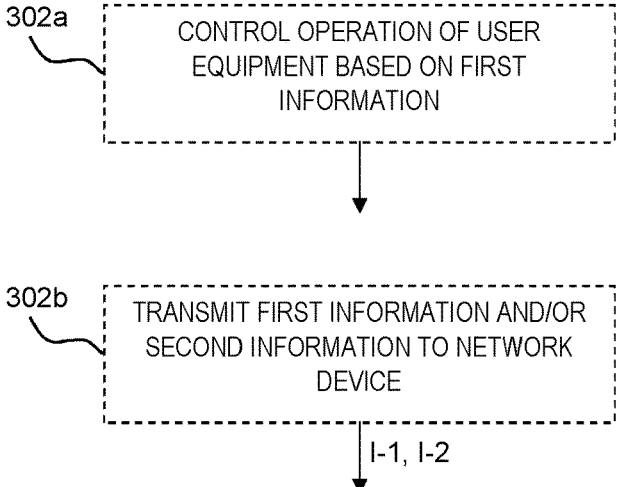

In some embodiments, the instructions 106 (FIG. 1), when executed by the at least one processor 102, cause the user equipment 10 to at least temporarily use 302 (FIG. 4) the first information I-1 for at least one of, FIG. 5: a) controlling 302*a* an operation of the user equipment 10, e.g. based on the first information I-1, b) transmitting 302*b* at least one of b1) the first information I-1 and b2) a second information I-2, which can be derived based at least on the first information I-1, to a network device 20.

In some embodiments, controlling 302*a* an operation of the user equipment 10 may e.g. comprise determining whether and/or when to transmit the first information I-1 or e.g. a measurement report based on the first information I-1, e.g. to a network device, e.g. a serving base station 20.

In some embodiments, transmitting 302*b* the first information I-1 and/or the second information I-2 to the network device 20 may e.g. enable or at least aid the network device 20 to perform load balancing, e.g. onloading and/or offloading terminal devices 10, e.g. based on the spatial separation characterized by the first information I-1.

In some embodiments, the second information I-2 may e.g. comprise a measurement report or a part of a measurement report, e.g. comprising the first information I-1.

Figure 6:
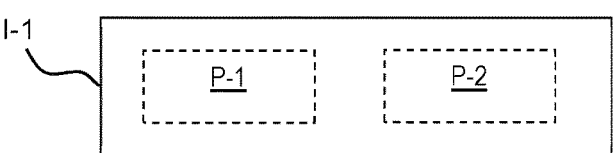

In some embodiments, FIG. 6, the first information I-1 comprises at least one of: a) a first parameter P-1 characterizing a spatial separation of a neighbor cell C-2 (FIG. 3), e.g. as measured by the user equipment 10, and b) a second parameter P-2 (FIG. 6) characterizing a spatial separation of a serving cell C-1 (FIG. 3), e.g. as measured by the user equipment 10.

In some embodiments, the first parameter P-1 may be denoted as "Dn", whereas e.g. the second parameter P-2 may be denoted as "Dp".

Figure 7:
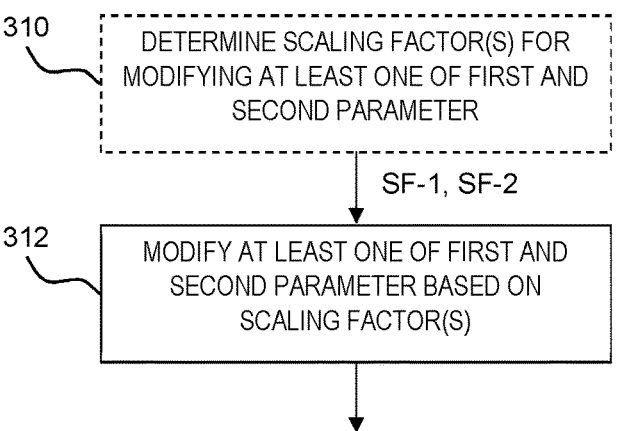

In some embodiments, the instructions 106 (FIG. 1), when executed by the at least one processor 102, cause the user equipment 10 to modify 312, FIG. 7, at least one of the first parameter P-1 and the second parameter P-2 based on at least one scaling factor SF-1, SF-2. This enables further degrees of freedom, e.g. when using the first parameter P-1 and/or the second parameter P-2 to control an operation of the user equipment 10.

In some embodiments, the user equipment 10 may determine 310 (FIG. 7) the at least one scaling factor SF-1, SF-2, e.g. by evaluating a configuration, e.g. a predetermined configuration. In some embodiments, the configuration may also be determined by standardization.

In some embodiments, determining 310 the at least one scaling factor SF-1, SF-2 may comprise receiving, by the user equipment 10, configuration information characterizing the at least one scaling factor, e.g. from the gNB 20.

In some embodiments, a serving cell C-1 (FIG. 3) or the network device 20 associated with the serving cell C-1, e.g. a serving base station, may provide the at least one scaling factor SF-1, SF-2, e.g. as a part of a measurement configuration provided to the user equipment 10, e.g. using an RRC (Radio Resource Control) Reconfiguration message, e.g. according to some accepted specification.

In some embodiments, at least one of the scaling factors SF-1, SF-2 may e.g. be denoted as "scalen_onload", whereas a further one of the scaling factors may e.g. be denoted as "scalep_offload".

Figure 8:
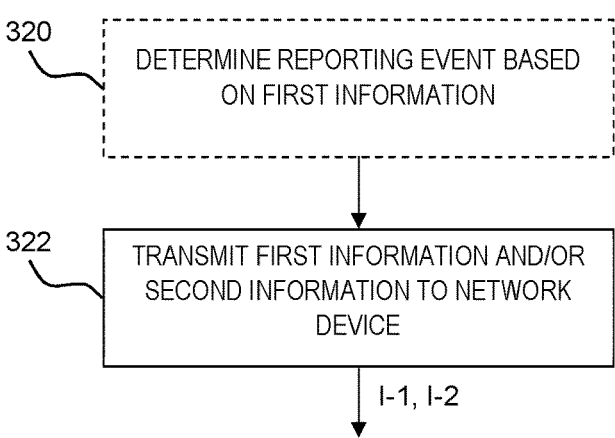

In some embodiments, the instructions 106 (FIG. 1), when executed by the at least one processor 102, cause the user equipment 10 to determine 320 (FIG. 8) a reporting event, e.g. measurement reporting event, based on the first information I-1, and to transmit 322 at least one of the first information I-1 and a/the second information I-2, which can be derived based at least on the first information I-1, to a network device 20, 30, e.g. the serving gNB 20 and/or another gNB 30.

In some embodiments, the measurement reporting event may be used to signal to a network device, e.g. a serving base station 20, that a handover from the serving base station 20 to a neighbor base station 30, e.g. target base station for the handover process, should be performed.

In some embodiments, the measurement reporting event may be an A3 event according to some accepted specifications. In other words, in some embodiments, the A3 event of some accepted specifications may be enhanced, e.g. by providing the first information I-1 and/or second information I-2 in the A3 measurement report.

In some embodiments, the measurement reporting event may be characterized based on the following relation:

$$Mn-Dn+Ofn+Ocn-Hys > Mp-Dp+Ofp+Ocp+Off+Hys \quad \text{(relation 1),}$$

wherein Mn characterizes a measurement result, e.g. cell quality, of a neighbor cell C-2, wherein Mp characterizes a measurement result, e.g. cell quality, of a serving cell C-1, wherein Dn is the first parameter P-1 (FIG. 6) of the first information I-1, wherein Dp is the second parameter P-2 of the first information I-1, wherein Ofn is a measurement object specific offset of a reference signal of the neighbor cell C-2, wherein Ofp is a measurement object specific offset of a reference signal of the serving cell C-1, e.g. offsetMO as defined within a measObjectNR corresponding to the neighbor cell according to some accepted specification.

In some embodiments, in relation 1, Ocn characterizes a cell-specific offset of the neighbor cell, and Ocp characterizes a cell-specific offset of the serving cell, e.g. cellIndividualOffset as defined within measObjectNR according to some accepted specification, corresponding to a frequency of the neighbor cell, and set to zero if not configured for the neighbor cell.

In some embodiments, in relation 1, Hys is a hysteresis parameter for the measurement reporting event, e.g. a hysteresis as defined within reportConfigNR according to some accepted specification.

In some embodiments, in relation 1, Off is an offset parameter for the measurement reporting event, e.g. an A3-Offset as e.g. defined within reportConfigNR according to some accepted specification.

In some embodiments, the measurement reporting event may be characterized based on the following relation:

$$Mn-scalen_{onload} \cdot Dn+Ofn+Ocn-Hys > Mp-$$
$$scalen_{offload} \cdot DP+Ofp+Ocp+Off+Hys \quad \text{(relation 2),}$$

wherein $scalen_{onload}$ characterizes the first scaling factor, and wherein $scalen_{onload}$ characterizes the second scaling factor.

In some embodiments, the first scaling factor SF-1 ("scalen_onload") may be configured by the network, e.g. network device 20, and may e.g. control an onloading (e.g. per neighbor n) associated with a radio cell. In some embodiments, the first scaling factor SF-1 may comprise a value between 0 and 1, wherein a value of 0 deactivates onloading, and wherein a value of 1 enables to exploits spatial separation information according to some embodiments.

As an example, assuming a 20 dB backward attenuation of a neighbor, e.g. target, cell C-2 on a serving antenna panel ("panel 1") 11 (FIG. 3), in some embodiments, this means that the user equipment 10 may stay up to 20 dB "longer" in the serving cell ("onloading"), and this may e.g. be achieved by scaling down the neighbor measurement Mn by up to 20 dB for onloading. In some embodiments, the network can decide via the first scaling factor "scalen_onload" (e.g., via choosing a specific value for the first scaling factor), whether and how aggressively to do the onloading. In some embodiments, the first scaling factor may e.g. be used by empty cells (or by cells with comparatively low load), which are willing to accommodate load from neighbor cells.

In some embodiments, the second scaling factor SF-2 ("scalep_offload") may be configured by the network, e.g. gNB 20, and may e.g. be used to control an offloading associated with a radio cell.

In some embodiments, the second scaling factor SF-2 may comprise a value between 0 and 1, wherein a value of 0 deactivates offloading, and wherein a value of 1 (fully) enables offloading, e.g. to exploit spatial separation information according to some embodiments. As an example, in some embodiments, one may scale down a SpCell (Special Cell) measurement by up to 20 dB and send early reports (offloading), e.g. if spatial separation as exemplarily characterized by the first information I-1 allows.

In some embodiments, the second scaling factor SF-2 ("scalep_offload") (and the second parameter P-2 ("Dp")) may e.g. be used by crowded cells which are willing to offload load towards empty (or less loaded) neighbor cells.

Figure 9:
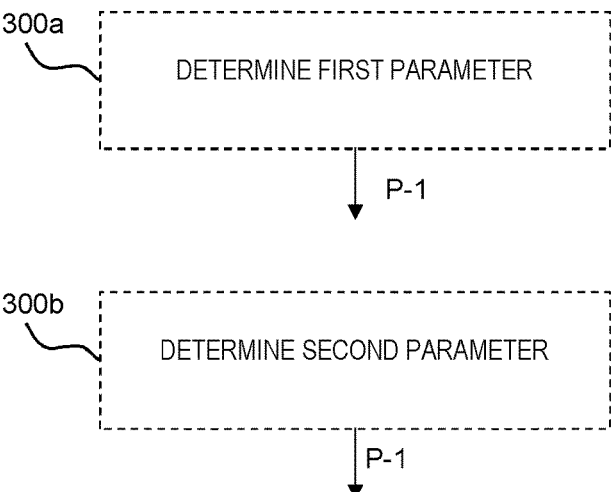

In some embodiments, the instructions 106, when executed by the at least one processor 102, cause the user equipment 10 to determine 300a (FIG. 9) the first parameter P-1, e.g. Dn, based on a difference between a measurement result of the neighbor cell C-2 and at least one of: a) a measurement result associated with the neighbor cell C-2 performed on one of the at least two antenna panels 11, 12 serving the serving cell C-1, b) an average value of the measurement results associated with the neighbor cell C-2 and all of the at least two antenna panels 11, 12, c) an average value of the measurement results associated with the neighbor cell C-2 and all of the at least two antenna panels different from a serving panel (used to serve the cell) for the neighbor cell C-2, and d) the maximum measurement result of the at least two antenna panels except the serving panel for the neighbor cell C-2.

In some embodiments, the instructions 106, when executed by the at least one processor 102, cause the user equipment 10 to determine the second parameter P-2, e.g. Dp, based on a difference between a measurement result of the serving cell C-1 and at least one of: a) a measurement result associated with the serving cell C-1 and one of the at least two antenna panels 11, 12 that would be used for serving the neighbor cell C-2, b) an average value of the measurement results associated with the serving cell C-1 and all of the at least two antenna panels 11, 12, c) an average value of the measurement results associated with the serving cell C-1 and all of the at least two antenna panels different from a serving panel for the serving cell, and d) the maximum measurement result of the at least two antenna panels except the one of the at least two antenna panels serving the serving cell.

In the following, the variants a), b), c), d) of determining 300*a* the first parameter (Dn) and of determining 300*b* the second parameter (Dp) according to some embodiments can be further detailed, see for example the following four options according to further embodiments:

In some embodiments, "M_x_y" is assumed to be the measurement of "cell x" on "antenna panel y", and px is the antenna panel used to serve cell x, i.e. pp is the serving panel used to serve the serving cell p. In some embodiments, "Mx" is defined as the best measurement among all M_x_y.

In some embodiments, the following exemplary options ("Option 1" to "Option 4") are usable, e.g. for determining the first parameter Dn and/or the second parameter Dp, e.g. as a difference between the measurement Mx and:

Option 1: measurement on a specific antenna panel, for example:

Dn=Mn−M_n_pp, i.e., the target cell measurement n on the serving panel pp. M_n_pp can e.g. be computed by taking an average of N' many strongest beams of a target cell n on a serving panel pp above a threshold T'.

Dp=Mp−M_p_pn, i.e. the SpCell measurement on the panel pn that would be used for serving target cell n. M_p_pn can be computed by taking average of N'' strongest beams of serving cell p on serving panel pn of target cell n above threshold T'.

Option 2: average of all panels (mean_y [M_x_y])

Dn=Mn−mean_y [M_n_y], where "mean_y [M_n_y]" denotes the average of M_n_y overall antenna panels.

Dp=Mp−mean_y [M_p_y] where "mean_y [M_p_y]" denotes the average of M_p_p overall panels.

Option3: average of all "other" panels (mean_y [M_x_{y< >px}])

Dn=Mn−mean_y [M_n_{y< >pn}] where "mean_y [M_n_{y< >pn}]]" denotes the average of M_n_y taken from the panels that are different from serving panel pn of target cell n.

Dp=Mp−mean_y [M_p_{y< >pp}] where "mean_y [M_p_{y< >pp}]" denotes the average of M_p_y taken from the panels that are different from pp of serving cell p.

Option4: the maximum of the other panels (max_y [M_x_{y< >px}])

Dn=Mn−max_y [M_n_{y< >pn}] where max_y [M_n_{y< >pn}] denotes the maximum M_n_y taken from the panels that are different from serving panel pn of target cell n.

Dp=Mp−max_y [M_p_{y< >pp}] where max_y [M_p_{y< >pp}] denotes the maximum M_n_y taken from the panels that are different from serving panel pn of target cell n.

Note that in some embodiments, in case of a user equipment 10 having two antenna panels 11, 12, options 3 and 4 are equivalent.

In some embodiments, the user equipment 10 may e.g. apply another, e.g. manufacturer specific, method for characterizing the spatial separations e.g. using the first parameter P-1 and the second parameter P-2, and/or for representing the first information I-1.

As an example, in some embodiments, the first information I-1 may be based on, e.g. analog, RF measurements, e.g. instead of digital measurements as exemplarily mentioned above with respect to the options 1 to 4. In some embodiments, this may simplify complexity for/of the user equipment 10, in particular if the user equipment 10 is e.g. restricted to receive/measure on a single antenna panel at a time.

In some embodiments, if available, the user equipment 10 may also use direction information of the involved cells C-1, C-2, e.g. serving cell C-1 and/or neighbor cells C-2 (potential handover target cells). In some embodiments, the direction information may e.g. be based on an angle of arrival of respective signals associated with the respective cells. In some embodiments, the first information I-1 may be derived from a beam pattern, e.g. beam characteristic, of the antenna panel 11, 12.

In some embodiments, the instructions 106, when executed by the at least one processor 102, cause the user equipment 10 to determine 330 (FIG. 10) a method for determining at least one of the first parameter P-1 and the second parameter P-2 based on at least one of: a) configuration, and b) an indication from a network device 20.

In other words, in some embodiments, the user equipment 10 may determine 332 the first and/or second parameter, e.g. following one of the options 1 to 4 exemplarily mentioned above, 1) as specified in a specification or configuration, or 2) as indicated by the network device 20, e.g. serving cell, e.g. using a (e.g., dedicated) signalling (for example RRC Reconfiguration according to some accepted specification).

In some embodiments, e.g. in the latter case, the serving cell C-1 may use two bits to indicate which definition or option of the first parameter P-1 and/or the second parameter P-2 the user equipment 10 shall apply.

Figure 2:
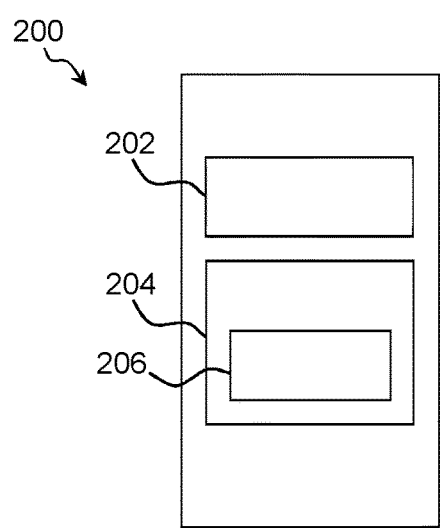

Further embodiments, FIG. 2, relate to an apparatus 200, comprising at least one processor 202, and at least one memory 204 storing instructions 206, the at least one memory 204 and the instructions 206 configured to, with the at least one processor 202, cause a network device 20 (FIG. 3) to receive 350 (FIG. 11) first information I-1 from a user equipment 10, e.g. a user equipment 10 according to the embodiments, the first information I-1 characterizing a spatial separation of a radio cell C-1, C-2 associated with the user equipment 10 with respect to at least two antenna panels 11, 12 of the user equipment 10. In some embodiments, the network device 20 may e.g. be a base state, e.g. a gNodeB (gNB).

In some embodiments, e.g. alternatively or additionally to receiving 350 the first information I-1 from the user equipment 10, the network device 20 may also receive the second information I-2 from the user equipment 10.

In some embodiments, the instructions 206, when executed by the at least one processor 202, cause the network device 20 to perform 352 load balancing based on the first information I-1. In some embodiments, the load balancing 352 may e.g. comprise onloading and/or offloading user equipment 10 to/from at least one radio cell C-1 provided by the network device 20.

In some embodiments, the instructions 206, when executed by the at least one processor 202, cause the network device 20 to perform 354 a handover decision based on at least one of: a) the first information I-1, b) the second information I-2 (e.g., measurement report), e.g. as received from the user equipment 10.

Figure 12:
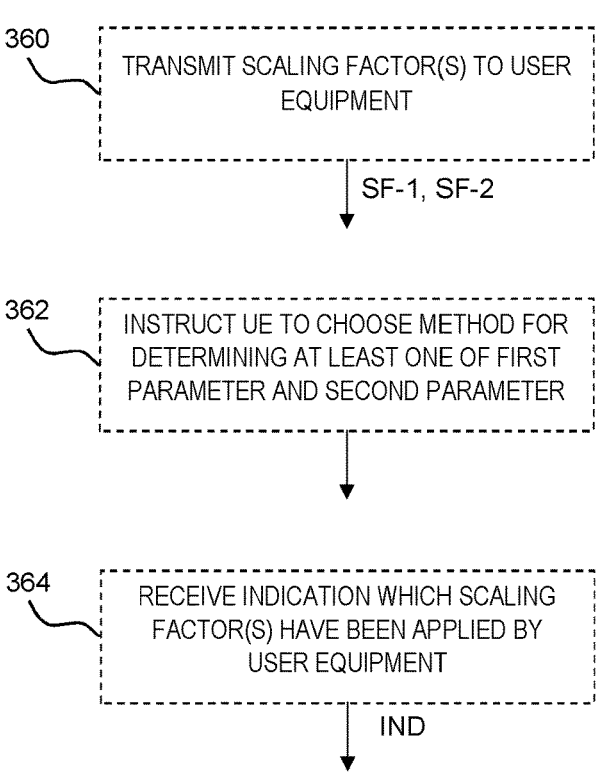

In some embodiments, the instructions 206, when executed by the at least one processor 202, cause the network device 20 to perform at least one of: a) transmitting 360 (FIG. 12) at least one scaling factor SF-1 to the user equipment 10 for modifying at least one of a first parameter P-1 and a second parameter P-2 of the first information I-1 based on the at least one scaling factor SF-1, SF-2, wherein the first parameter P-1 characterizes a spatial separation of a neighbor cell C-2, and wherein the second parameter P-2 characterizes a spatial separation of a serving cell C-1, b) instructing 362 the user equipment 10 which method of a plurality of methods to choose for determining 332 at least one of the first parameter P-1 and the second parameter P-2, and c) receiving 364 an indication IND characterizing which scaling factor SF-1, SF-2 a user equipment 10 has applied to its measurements associated with at least one cell.

In some embodiments, the receiving 364 of the indication IND characterizing which scaling factor a user equipment has applied to its measurements associated with at least one cell may e.g. be performed by a target gNB 30 (FIG. 3) for a handover process.

Further embodiments relate to a method comprising: determining 300 (FIG. 4), by a user equipment 10, a first information I-1 characterizing a spatial separation of a radio cell C-1, C-2 associated with the user equipment 10 with respect to at least two antenna panels 11, 12 of the user equipment 10.

Further embodiments relate to a method comprising: receiving 350 (FIG. 11), by a network device 20, first information I-1 from a user equipment 10, the first information I-1 characterizing a spatial separation of a radio cell C-1, C-2 associated with the user equipment 10 with respect to at least two antenna panels 11, 12 of the user equipment 10.

Further embodiments relate to an apparatus 100', FIG. 13, comprising means 102' for determining a first information I-1 characterizing a spatial separation of a radio cell associated with a user equipment with respect to at least two antenna panels of the user equipment. In some embodiments, the means 102' for determining the first information may e.g. comprise at least one processor 102, and at least one memory 104 storing instructions 106, the at least one memory 104 and the instructions 106 configured to, with the at least one processor 102, perform said step(s).

Further embodiments, FIG. 14, relate to an apparatus 200' comprising means 202' for receiving first information I-1 from a user equipment 10, the first information I-1 characterizing a spatial separation of a radio cell C-1, C-2 associated with the user equipment 10 with respect to at least two antenna panels 11, 12 of the user equipment 10. In some embodiments, the means 202' for receiving the first information I-1 from a user equipment may e.g. comprise at least one processor 202, and at least one memory 204 storing instructions 206, the at least one memory 204 and the instructions 206 configured to, with the at least one processor 202, perform said step(s).

Further embodiments relate to a wireless communications system 1, FIG. 3, comprising at least one user equipment 10 according to the embodiments and/or at least one network device 20, 30 according to the embodiments.

Figure 15:
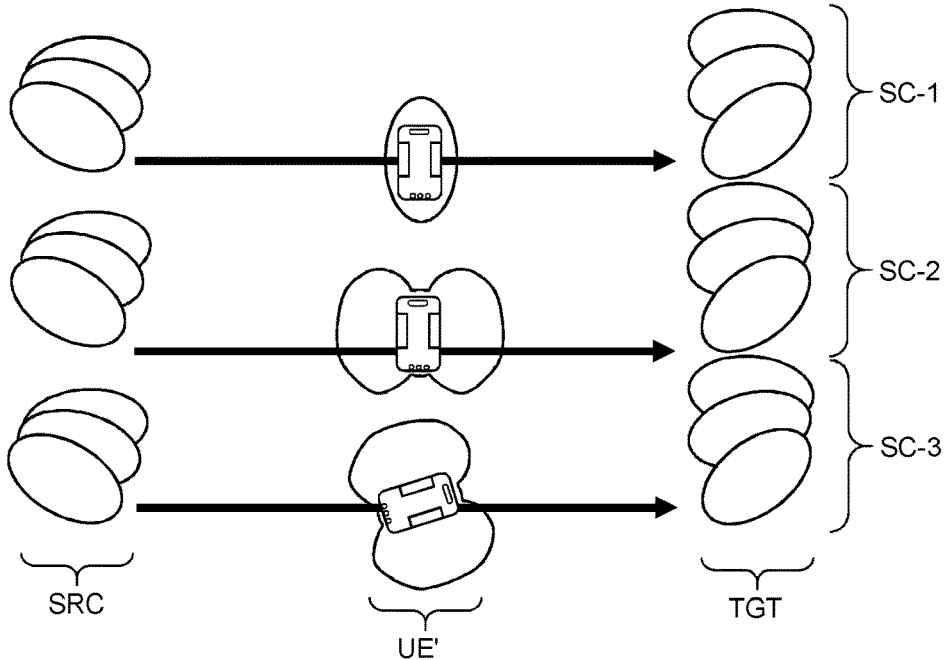

FIG. 15 schematically depicts a simplified block diagram according to some embodiments. Depicted are three scenarios SC1, SC2, SC3 of user equipment 10' having a plurality of antenna panels, as well as a source cell SRC and a potential target cell TGT of a handover procedure.

In some embodiments, the level of inter-cell interference (ICI) depends on the UE's antenna architecture and its orientation. This is illustrated in FIG. 15, which shows three different cases:

a) UE 10' with omni-directional antenna (scenario SC1), b) Multi-panel UE 10' with best UE orientation with respect to inter-cell interference minimization (scenario SC2), and c) Multi-panel UE 10' with bad orientation with respect to inter-cell interference (scenario SC3).

For the omni-UE in case a), both serving and target cells are received in the same omni-antenna creating a maximum level of interference. If the UE is not connected to the closest/strongest cell, the SINR is soon below 0 dB. In this scenario, there may only be one cell with SINR>0 dB, while all other cells have an SINR<0 dB which makes a connection very inefficient or even impossible (assuming that the cells have some decent load). In other words, in the omni case, the radio conditions are not favourable for relevant load balancing, they may rather force the UE to be connected to the strongest cell.

In case of MPUE case b) of FIG. 15, in some embodiments, the serving cell SRC is received with high signal power on antenna panel 1 and weak power on antenna panel 2. Conversely, the target cell TGT is received with high signal power on antenna panel 2 and weak power on antenna panel 1. If, according to some embodiments, the antenna panel 1 is used as serving panel for the UE, the interference of the target cell TGT may be attenuated by the antenna/beamforming pattern of antenna panel 1, creating in turn little interference. In contrast to the omni case a), in case b), according to some embodiments, the UE can have SINR>>0 dB even when it connects to the weaker cell. It can be concluded that such a UE can be well connected to either serving cell SRC or target cell TGT, over a comparatively wide range (e.g., due to the interference isolation provided by the panel).

However, if the MPUE UE' changes orientation (clockwise as shown in case c) of FIG. 15, the signal of target cell received on antenna panel 1 may have a similar antenna pattern/beamforming attenuation of serving cell signal, creating again high level of interference, similar to case a). From this case it can be learned that MPUE UE' do not generally allow for relevant load balancing per se. Rather, some constellations (i.e. orientation wrt. cells SRC, TGT) may allow for significant load balancing (e.g. scenario b)), but others do not (e.g. scenario c)). Thus, in some embodiments, it is beneficial if a load balancing mechanism may adapt to the specific constellation. Furthermore, note that in practice different UEs may have different orientations, i.e. the network may not able to learn the orientation from the past.

In view of this, aspects according to the embodiments enable to employ the spatial separation, e.g. characterized by the first information I-1, to aid or facilitate load balancing at the gNB, see for example block 252 of FIG. 11.

In some embodiments, a novel measurement reporting event may be provided, based on the first information I-1, and, using this novel measurement reporting event, e.g. MPUE specific measurements and/or spatial separation of a respective cell C-1, C-2 may be leveraged to achieve e.g. a larger handover region, e.g. allowing a better redistribution of UEs and thereby better load balancing.

In some embodiments, the first parameter P-1 ("Dn") and/or the second parameter P-2 ("Dp") may be quantities that are determined, e.g. measured, by the UE 10 and not (necessarily) reported to network. In some embodiments, this has the advantage, that the measurements of the multiple antenna panels 11, 12 may still remain transparent to the network, as in some accepted specifications. Note that in some embodiments, the constellation (i.e. the spatial orientation of the UE 10) may be inherently covered in the spatial separations as characterized by the first information, e.g. in the form of the first and/or second parameter.

In some embodiments, the UE 10 may include the values of the first parameter P-1 ("Dn") and/or the second parameter P-2 ("Dp") in a measurement report sent to the serving cell C-1.

In some embodiments, the UE 10 may indicate to a cell C-2 (target cell of handover, new cell that it connects to or re-establishes to) that it has applied a scaling for the measurements of serving and target cell using the scaling factors SF-1, SF-2 (scalen_onload, scalep_offload), Dn and/or Dp (whose values could be reported as well).

Some embodiments allow the network to efficiently onload and/or offload MPUEs 10, e.g. leading to better usage of radio resources.

In some embodiments, the proposed method inherently takes the spatial orientation of the UE 10, and thereby the spatial interference isolation provided by the antenna panels 11, 12 into account.

In some embodiments, the network is still able to scale the usage of the feature via the optional scaling factors SF-1, SF-2.

The invention claimed is:

1. A user equipment, comprising at least one processor, and at least one memory storing instructions, the at least one memory and the instructions configured to, with the at least one processor, cause the user equipment to determine a first information characterizing a spatial separation of a radio cell associated with the user equipment with respect to at least two antenna panels of the user equipment and transmit the first information to a network device, wherein the instructions, when executed by the at least one processor, cause the user equipment to perform at least one of:

(a) receive, from the network device, at least one scaling factor for modifying at least one of a first parameter and a second parameter of the first information based on the at least one scaling factor, wherein the first parameter characterizes a spatial separation of a neighbor cell and the second parameter characterizes a spatial separation of a serving cell;

(b) receive, from the network device, an instruction indicating which method of a plurality of methods to use for determining at least one of the first parameter and the second parameter; and (c) transmit, to the network device, an indication characterizing which scaling factor(s) the user equipment has applied to its measurements associated with at least one cell.

2. The user equipment according to claim 1, wherein the instructions, when executed by the at least one processor, cause the user equipment to at least temporarily use the first information for at least one of: a) controlling an operation of the user equipment, b) transmitting at least one of b1) the first information and b2) a second information, which can be derived based at least on the first information, to a network device.

3. The user equipment according to claim 1, wherein the first information comprises at least one of: a) a first parameter characterizing a spatial separation of a neighbor cell, and b) a second parameter characterizing a spatial separation of a serving cell.

4. The user equipment according to claim 3, wherein the instructions, when executed by the at least one processor, cause the user equipment to modify at least one of the first parameter and the second parameter based on at least one scaling factor.

5. The user equipment according to claim 1, wherein the instructions, when executed by the at least one processor, cause the user equipment to: determine a reporting event based on the first information, and to transmit at least one of the first information and a second information, which can be derived based at least on the first information, to a network device.

6. The user equipment apparatus according to claim 3, wherein the instructions, when executed by the at least one processor, cause the user equipment to determine the first parameter based on a difference between a measurement result of the neighbor cell and at least one of: a) a measurement result associated with the neighbor cell performed on one of the at least two antenna panels serving the serving cell, b) an average value of the measurement results associated with the neighbor cell and all of the at least two antenna panels, c) an average value of the measurement results associated with the neighbor cell and all of the at least two antenna panels different from a serving panel for the neighbor cell, and d) the maximum measurement result of the at least two antenna panels except the serving panel for the neighbor cell.

7. The user equipment according to claim 3, wherein the instructions, when executed by the at least one processor, cause the user equipment to determine the second parameter based on a difference between a measurement result of the serving cell and at least one of: a) a measurement result associated with the serving cell and one of the at least two antenna panels that would be used for serving the neighbor cell, b) an average value of the measurement results associated with the serving cell and all of the at least two antenna panels, c) an average value of the measurement results associated with the serving cell and all of the at least two antenna panels different from a serving panel for the serving cell, and d) the maximum measurement result of the at least two antenna panels except the one of the at least two antenna panels serving the serving cell.

8. The user equipment according to claim 3, wherein the instructions, when executed by the at least one processor cause the user equipment to determine a method for determining at least one of the first parameter and the second parameter based on at least one of: a) configuration, and b) an indication from a network device.

9. A network device, comprising at least one processor, and at least one memory storing instructions, the at least one memory and the instructions configured to, with the at least one processor, cause the network device to receive first information from a user equipment, the first information characterizing a spatial separation of a radio cell associated with the user equipment with respect to at least two antenna panels of the user equipment, wherein the instructions, when executed by the at least one processor, cause the network device to perform at least one of:

(a) transmitting at least one scaling factor to the user equipment for modifying at least one of a first parameter and a second parameter of the first information based on the at least one scaling factor, wherein the first parameter characterizes a spatial separation of a neighbor cell and the second parameter characterizes a spatial separation of a serving cell;

(b) instructing the user equipment which method of a plurality of methods to choose for determining at least one of the first parameter and the second parameter; and (c) receiving an indication characterizing which scaling factor(s) the user equipment has applied to its measurements associated with at least one cell.

10. The network device according to claim 9, wherein the instructions, when executed by the at least one processor, cause the network device to perform load balancing based on the first information.

11. A method comprising: determining, by a user equipment, a first information characterizing a spatial separation of a radio cell associated with the user equipment with respect to at least two antenna panels of the user equipment and transmitting the first information to a network device, the method further comprising performing, by the user equipment, at least one of:

(a) receiving, from the network device, at least one scaling factor for modifying at least one of a first parameter and a second parameter of the first information based on the at least one scaling factor, wherein the first parameter characterizes a spatial separation of a neighbor cell and the second parameter characterizes a spatial separation of a serving cell;

(b) receiving, from the network device, an instruction indicating which method of a plurality of methods to use for determining at least one of the first parameter and the second parameter; and (c) transmitting, to the network device, an indication characterizing which scaling factor(s) the user equipment has applied to its measurements associated with at least one cell.

12. The method according to claim 11, further comprising at least temporarily using the first information for at least one of: a) controlling an operation of the user equipment, b) transmitting at least one of b1) the first information and b2) a second information, which can be derived based at least on the first information, to a network device.

13. The method according to claim 11, wherein the first information comprises at least one of: a) a first parameter characterizing a spatial separation of a neighbor cell, and b) a second parameter characterizing a spatial separation of a serving cell.

14. The method according to claim 13, further comprising modifying at least one of the first parameter and the second parameter based on at least one scaling factor.

15. The method according to claim 11, further comprising determining a reporting event based on the first information; and transmitting at least one of the first information and a second information, which can be derived based at least on the first information, to a network device.

16. The method according to claim 13, further comprising determining the first parameter based on a difference between a measurement result of the neighbor cell and at least one of: a) a measurement result associated with the neighbor cell performed on one of the at least two antenna panels serving the serving cell, b) an average value of the measurement results associated with the neighbor cell and all of the at least two antenna panels, c) an average value of the measurement results associated with the neighbor cell and all of the at least two antenna panels different from a serving panel for the neighbor cell, and d) the maximum measurement result of the at least two antenna panels except the serving panel for the neighbor cell.

17. The method according to claim 13, further comprising determining the second parameter based on a difference between a measurement result of the serving cell and at least one of: a) a measurement result associated with the serving cell and one of the at least two antenna panels that would be used for serving the neighbor cell, b) an average value of the measurement results associated with the serving cell and all of the at least two antenna panels, c) an average value of the measurement results associated with the serving cell and all of the at least two antenna panels different from a serving panel for the serving cell, and d) the maximum measurement result of the at least two antenna panels except the one of the at least two antenna panels serving the serving cell.

18. The method according to claim 13, determining a method for determining at least one of the first parameter and the second parameter based on at least one of: a) configuration, and b) an indication from a network device.

\* \* \* \* \*